United States Patent
Corrieri et al.

(10) Patent No.: US 11,869,027 B1
(45) Date of Patent: *Jan. 9, 2024

(54) SYSTEM, METHOD, AND COMPUTER PROGRAM FOR PROVIDING, AUTOMATICALLY TRYING, AND APPLYING ELECTRONIC COUPON CODES AND CASH BACK IN ELECTRONIC COMMERCE

(71) Applicant: PIGGY LLC, Lake Mary, FL (US)

(72) Inventors: Nicholas Corrieri, Sartell, MN (US); John Ginsberg, Southend on the Sea (GB)

(73) Assignee: PIGGY LLC, Lake Mary, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/606,856

(22) Filed: May 26, 2017

Related U.S. Application Data

(63) Continuation-in-part of application No. 15/261,733, filed on Sep. 9, 2016.

(60) Provisional application No. 62/216,111, filed on Sep. 9, 2015.

(51) Int. Cl.
*G06Q 30/00* (2023.01)
*G06Q 30/0207* (2023.01)
*G06Q 30/0601* (2023.01)
*G06F 16/955* (2019.01)

(52) U.S. Cl.
CPC ..... *G06Q 30/0222* (2013.01); *G06F 16/9566* (2019.01); *G06Q 30/0641* (2013.01)

(58) Field of Classification Search
CPC .............. G06Q 30/0641; G06F 16/9566
See application file for complete search history.

(56) References Cited

U.S. PATENT DOCUMENTS

| | | |
|---|---|---|
| 7,254,569 B2 | 8/2007 | Goodman et al. |
| 8,160,914 B1 | 4/2012 | Karipides |
| 8,549,141 B1 | 10/2013 | Nayfeh |
| 10,062,062 B1 | 8/2018 | Mcghie et al. |
| 10,748,170 B2 * | 8/2020 | El-Hage ............ G06Q 30/0228 |
| 10,915,936 B1 | 2/2021 | Vora |
| 2002/0026584 A1 | 2/2002 | Skubic et al. |
| 2002/0178060 A1 * | 11/2002 | Sheehan ................ G06Q 30/02 705/14.25 |
| 2005/0021417 A1 | 1/2005 | Kassan |
| 2005/0197893 A1 | 9/2005 | Landau et al. |

(Continued)

OTHER PUBLICATIONS

Extended European Search Report for Application No. 19861894.4, dated May 3, 2022, 7 pages.

(Continued)

*Primary Examiner* — Alvin L Brown
(74) *Attorney, Agent, or Firm* — Davis Wright Tremaine LLP

(57) ABSTRACT

The present invention generally relates to a system, method, and computer program for providing coupons and cash back in electronic commerce. Specifically, electronic coupon code(s) are tested against various retailer websites to ascertain the best combination and automatically applied into a user's cart during electronic checkout. Various embodiments of the present invention also provide the user-less tracking of an affiliate purchase in order to apportion user cash back without first requiring the creation of a user account.

24 Claims, 12 Drawing Sheets

(56) References Cited

U.S. PATENT DOCUMENTS

| | | |
|---|---|---|
| 2008/0281688 A1 | 11/2008 | Kluth |
| 2010/0268592 A1* | 10/2010 | Shaer ............... G06Q 30/02 705/14.38 |
| 2011/0082741 A1* | 4/2011 | Boal ................ G06Q 30/02 705/14.39 |
| 2011/0191252 A1 | 8/2011 | Dai |
| 2011/0288918 A1 | 11/2011 | Cervenka et al. |
| 2012/0022976 A1 | 1/2012 | Almeida |
| 2012/0130788 A1* | 5/2012 | Winslade .......... G06Q 30/02 705/14.23 |
| 2012/0278186 A1 | 11/2012 | Hayton et al. |
| 2013/0080235 A1 | 3/2013 | Wolfe |
| 2013/0138491 A1 | 5/2013 | Gao et al. |
| 2013/0179250 A1* | 7/2013 | Nguyen ............ G06Q 20/387 705/14.36 |
| 2013/0275203 A1 | 10/2013 | Anderson et al. |
| 2014/0046794 A1 | 2/2014 | Vallery et al. |
| 2014/0067596 A1 | 3/2014 | McGovern et al. |
| 2014/0095287 A1 | 4/2014 | Whitney |
| 2014/0114755 A1 | 4/2014 | Mezzacca |
| 2014/0122203 A1 | 5/2014 | Johnson et al. |
| 2014/0180790 A1 | 6/2014 | Boal |
| 2014/0200985 A1 | 7/2014 | Choong Cheng Shien et al. |
| 2014/0249935 A1 | 9/2014 | Daily et al. |
| 2014/0337513 A1 | 11/2014 | Amalapurapu et al. |
| 2014/0358629 A1 | 12/2014 | Shivaswamy et al. |
| 2015/0039408 A1 | 2/2015 | Raman |
| 2015/0058108 A1 | 2/2015 | Winters et al. |
| 2015/0088630 A1 | 3/2015 | Taylor et al. |
| 2015/0142543 A1* | 5/2015 | Lellouche ......... G06Q 30/0222 705/14.23 |
| 2015/0142610 A1 | 5/2015 | Manoharan et al. |
| 2015/0170193 A1* | 6/2015 | Lounsbury, Jr. ... G06Q 30/0238 705/14.38 |
| 2015/0254365 A1 | 9/2015 | Sadri et al. |
| 2016/0012499 A1 | 1/2016 | Linevsky et al. |
| 2016/0071187 A1 | 3/2016 | Bhosle et al. |
| 2016/0086243 A1 | 3/2016 | Zimmerman et al. |
| 2016/0155151 A1* | 6/2016 | Bandara ............ G06Q 30/0255 705/14.58 |
| 2016/0189137 A1 | 6/2016 | Zhou et al. |
| 2017/0148046 A1 | 5/2017 | Akbarpour Mashadi et al. |
| 2017/0169502 A1 | 6/2017 | Kreiner et al. |
| 2018/0019984 A1 | 1/2018 | Isaacson et al. |
| 2018/0114242 A1 | 4/2018 | Lopez et al. |
| 2018/0150869 A1 | 5/2018 | Finnegan et al. |
| 2019/0259050 A1 | 8/2019 | Hudson et al. |
| 2019/0392007 A1 | 12/2019 | Jindra et al. |
| 2019/0392503 A1 | 12/2019 | Corrieri et al. |
| 2020/0082425 A1 | 3/2020 | Corrieri et al. |
| 2020/0143392 A1 | 5/2020 | Tietzen et al. |
| 2021/0150578 A1 | 5/2021 | Cheng et al. |

OTHER PUBLICATIONS

PCT International Preliminary Report on Patentability in International Application PCT/US2019/051537, dated Mar. 25, 2021, 19 pages.

PCT International Search Report and Written Opinion in International Application PCT/US2019/051537, dated Feb. 11, 2020, 21 pages.

PCT International Search Report and Written Opinion in International Application PCT/US2021/012178, dated Mar. 30, 2021, 14 pages.

Wilson, "Google Analytics: 3 Tests to Ensure your Checkout Process is Working," PracticalEcommerce.com, Jul. 13, 2012, 7 pages.

* cited by examiner

SYSTEM, METHOD, AND COMPUTER PROGRAM FOR PROVIDING, AUTOMATICALLY TRYING, AND APPLYING ELECTRONIC COUPON CODES AND CASH BACK IN ELECTRONIC COMMERCE

BACKGROUND OF THE INVENTION

Claim of Priority

This application claims priority to U.S. Provisional Application No. 15/261,733, filed on Sep. 9, 2016, which claims priority to U.S. Provisional Application No. 62/216,111, filed on Sep. 9, 2015, the disclosure of which is explicitly incorporated by reference herein, in its entirety.

Field of the Invention

The present invention generally relates to systems, methods, and computer programs for providing electronic coupon codes and cash back in electronic commerce. Specifically, electronic coupon code(s) are tested against various retailers to ascertain the best combination and then automatically populated into a user's coupon field(s) during electronic checkout. Various embodiments of the present invention also provide the user-less tracking of an affiliate purchase in order to apportion user cash back without first requiring the creation of a user account.

DESCRIPTION OF THE RELATED ART

Electronic commerce ("e-commerce") generally utilizes the internet to conduct retail transactions, or "e-commerce transactions." As such, it has adopted a number of features that are analogous to brick-and-mortar institutions, such as shopping carts. To this end, most e-commerce websites utilize electronic coupon codes, strings of letters and/or digits which must be input by a consumer, to provide customers with discounts, as opposed to physical coupons. These electronic coupon codes may be issued to the public at large, either via marketing or advertising, or may be issued to individual consumers, or groups of consumers, for various purposes. Either way, the electronic coupon code must be known before it can be utilized during checkout of an e-commerce transaction. Several attempts have heretofore been made to aggregate known electronic coupon codes for the public benefit, usually as listings on websites dedicated to such a purpose. This solution has not been ideal as it requires consumers to first seek out applicable electronic coupon codes, and then manually test each one to determine whether it is still viable. As such, there is a need in the art for an automated solution. The present invention answers such a need, and provides several additional benefits to consumers in order to facilitate e-commerce transactions.

SUMMARY OF THE INVENTION

The present invention is generally directed to providing electronic coupon codes and cash back in electronic commerce and accompanying systems, methods, and computer programs thereof. One embodiment of the present invention facilitates the provision of electronic coupon codes in electronic commerce ("e-commerce") settings, websites offering retail. Accordingly, a preferred embodiment comprises a browser "plug-in," or background service, whether in a desktop, mobile, or wearable electronic operating system, which may be implemented for tracking the current website or store a user is visiting and automatically populating at least one electronic coupon or coupon code.

For example, in a browser plug-in embodiment, a URL or URI may be tracked, and upon a change or a user's visit to a recognized store, at least one electronic coupon code may be retrieved by the browser plug-in from an application server communicating with the plug-in.

An algorithm may be implemented in order to detect a website URL, or determine the type of store, and accordingly access various data fields, preferably in a uniform format across different stores, in order to determine which electronic coupon code(s) to retrieve for insertion into the user's checkout process at the store, usually constructed as an input field in the "checkout webpage" of a website—the webpage which allows the user to initiate and/or complete the e-commerce transaction by entering payment and/or shipping information.

DOM parsing rules may be implemented, for example, to access various fields from the store via JavaScript code. Individual algorithms may be implemented for different proprietary stores (such as Amazon.com and other large retailers), as well as available out-of-the-box electronic commerce solutions or stores such as Joomla, Magenta, or Wordpress plugins, Shopify, Volusion, Bigcommerce, big-cartel, 3dcart, Squarespace, and the like. Each algorithm specific to a particular store may established by reverse engineering an existing online store and/or store shopping cart, such as to securely retrieve, submit, and validate responses to the input fields within the online store and/or shopping cart. Certain stores may require the redaction of prices of items, charges for the quantity of shipping, in order to obtain a set of usable data fields for the application server, and as such, the present invention may be configured to comply with same.

The electronic coupon code(s) may be predetermined to be the "best" code or set of codes in accordance with a rules engine. The rules engine may determine the best code based on crowd sourced user feedback (i.e. voting), administrator setting at the application server of various coupon priorities, numerical percentage or dollar off, other factors, or combinations thereof. As such, the rules engine is configured to establish a ranking of codes according to at least the aforementioned metrics, with the "best" electronic coupon code, or set of electronic coupon codes, being the highest ranked electronic coupon code or set of electronic coupon codes. A database of electronic coupon codes may be stored at the application server, the database of electronic coupon codes may be manually inserted, user-uploaded, or received from respective APIs and/or third party application servers of affiliates and partners.

The rules engine may run in part or in whole on the application server and/or on the user or client device as a background process. On an application server embodiment, each time a new electronic coupon code is inserted for a certain store, the application server may run an algorithm to ascertain the numerical discount, percentage discount, and/or combinability of the new code with existing electronic coupon codes, and determine a preset "best" or highest ranked set of codes at the application server. This would then be pulled or pushed from the application server to the client device or browser plug-in running thereon at the time of a customer's "checkout" or completion of the e-commerce transaction. In the client side embodiment, a plurality of electronic coupon codes may be pulled or pushed from the application server to be tested on the fly on the client device. This embodiment allows customization of the electronic coupon codes to the particular user, as a user may have exhausted certain electronic coupon code already.

In at least one embodiment, if a electronic coupon code is applied a number of times and is unsuccessful in achieving a reduction of the user's e-commerce transaction amount, the application server may set a flag for human review to ensure that the electronic coupon code is still valid, or, in yet further embodiments, may automatically set the code to be invalid and to therefore be no longer utilized by the rules engine.

The highest ranked electronic coupon codes may be automatically (requiring no user action) or semi-automatically (requiring a single or a few user action(s)) populated into the coupon fields of an online store, in accordance with the rules engine.

Another embodiment of the present invention provides for the user-less, or anonymous, tracking of an affiliate purchase in order to apportion user cash back without first requiring the creation of a user account. The present service receives a percentage of product sales for each product sold through an affiliate network or partnership. This revenue is then divided up or apportioned to the user making the purchase, therefore providing them with a so-called "cash back." The tracking of this cash back is believed to be particularly novel because the present service and application server are able to track e-commerce transactions, without first requiring the user to create a user account at the application server or service.

In order to support this, an identifier is assigned to the application (application identifier or App ID), such as the browser plug-in, background process, or other desktop or mobile application, upon installation and/or first communication to the application server. A table of Application IDs are kept on the application server, which checks and logs new unique App IDs.

Signed communications are then utilized, i.e. a unique identifier tagged into any links or navigable portions for effecting action at the application server and/or client device. The application server may then track actions, i.e. clicks, and purchases through the plug-in and tie the actions to the App ID.

As discussed, this feature allows the application server to track users without first forcing or requiring registration of personal information during either the coupon use or cash back receiving steps. The transaction is preferably kept for a number of days, such as 10, 15, 30, 45, 60 days in order to encourage user registration. Later, when a user uses the installed application having the App ID to create a user account, traditional user registration (or login by $3^{rd}$ party APIs described below) is used, and the data associated with an App ID is then merged into the user account.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
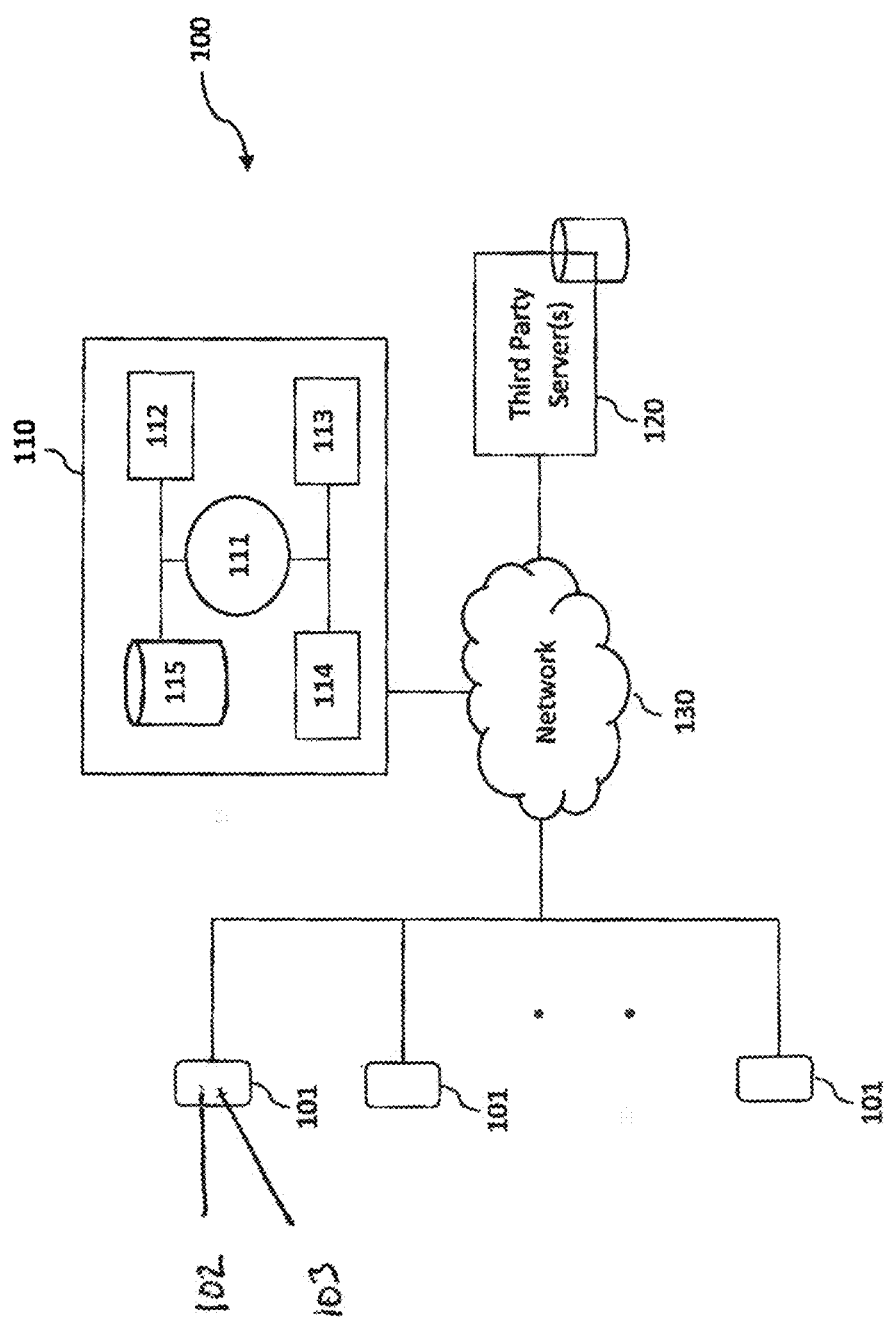
FIG. 1 is a diagrammatic representation of an exemplary application and implementation environment for providing electronic coupon codes and cash back in electronic commerce of the present invention.

The present invention may be implementable on an application server in a software-as-a-service (SaaS) or mobile application environment in accordance with implementation on a system or application 100 as generally represented in FIG. 1. Accordingly, the system 100 of the present invention generally comprises at least one client device 101 communicably connected to an application server 110 over a network 130. One or more third party server(s) 120 may further be communicably connected to the application server 110 and the at least one client device 101 over the same network 130.

The client device 101 may comprise a mobile device, a cellular phone, a tablet, a computer, a wearable electronic device, or any other device or combination of circuits structured and configured to communicate with another device, computer, or server over the network 130. The client device 101 may comprise application(s) and user interface(s) (front-end interface) that allows a user to interact with the application server 110 and any third party server(s) 120 and stored applications and programs thereon (back-end processing). The user interface may be proprietary and may comprise a custom developed mobile or desktop application(s). Alternatively, or in addition to, the user interface may comprise a web browser (including mobile browsers designed for use on a mobile device) or other application or executable code that allows for communication and visualization of information.

The term "application server" 110, "third party server" 120 refer to at least one computer having appropriate hardware and applications installed thereon for the provision of server services including web and other functional services described herein, such that a user may access, execute, and/or view the applications remotely from a client device 101. More specifically, the application server 110 and third party server(s) 120 may comprise general-purpose computers, specialized computers, or other hardware components structured and configured to receive, process, transmit, and store information to and from other devices. The application server 110 is further configured with executable or interpretable computer code that allows it to perform the processes described within this application.

For example, the application server 110 may comprise a general-purpose computer comprising a central processing unit (CPU) 111, which may be a single core or multi core processor, memory 114 (random-access memory, read-only memory, and/or flash memory) or primary memory for high-speed storage of executing programs, electronic storage unit 115 (e.g., hard disk) or secondary memory for storing data, communications interface 112 (e.g., network adapter) for communicating with other devices or computers over a network, and/or peripheral device(s) 113 in communication with the CPU 111 that enable input/output of the application server 110.

The application server 110 may implement the methodology of the present invention using any number of solution stacks (a set of software subsystems or components) known to an ordinary computer or web programmer skilled in the art. These solution stacks may include, without limitation, ZEND Server, APACHE Server, NODE.JS, ASP, PHP, Ruby, XAMPP, LAMP, WAMP, MAMP, WISA, LEAP, GLASS, LYME, LYCE, OpenStack, Ganeti, MEAN, MEEN, XRX, JAVASCRIPT and other past, present, or future equivalent solution stacks, or combinations thereof, known to those skilled in the art that allows a programmer to develop the methods and computer programs described within this application. The software stack might be implemented without third-party cloud platforms, for example using load balancing and virtualization software provided by Citrix, Microsoft, VMware, Map-Reduce, Google Filesystem, Xen, memory caching software such as Memcached and Membase, structured storage software such as MySQL, MariaDB, XtraDB, etc. and/or other appropriate platforms. Of course, these solution stacks may also be deployed in cloud platforms by using known development tools and server hosting services such as GitHub and Rackspace, as well as their equivalents.

The third party server(s) 120 may comprise any combination of hardware and software (code segments in any number of programmable, executable, or interpretable languages that support the functionality of the methods described herein) configured to host and transmit items of a user. The third party server(s) 120 may be configured to communicate directly to the application server 110 via application programming interfaces or upon the request of a user.

User account services may be implemented using one or more solution stacks as described above. Alternatively, third party login services such as Facebook, Twitter, LinkedIn, Google and other related services, may be utilized for user account login and authentication, such as via existing third party server(s) 120 of other parties.

The network 130 may comprise at least two computers in communication with each other, which may form a data network such as via LAN, WAN, Serial, Z-WAVE, ZIGBEE, RS-485, MODBUS, BACNET, the Internet, or combinations thereof. The connections may be facilitated over various wired and/or wireless mediums or any combination thereof including interconnections by routers and/or gateways. Network 130 may comprise additional hardware components and/or devices appropriate for facilitating the transmission and communication between the various systems and devices of the present invention, such as those directed to integrated authentication, quality control or to improve content delivery such as via a content delivery network (CDN).

Various aspects of the present invention may be thought of as "products" or "articles of manufacture" typically in the form of machine (or processor) executable code, interpretable code, and/or associated data that is carried on or embodied in a machine readable medium. Machine-executable code can be stored on an electronic storage unit, such memory (e.g., read-only memory, random-access memory, flash memory) or a hard disk, as described above.

All or portions of the software may at times be communicated through the Internet or other communication networks. Such communications, for example, may enable loading of the software from one computer or processor onto another, for example, from a management server or host computer onto the computer platform of an application server, or from an application server onto a client computer or device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, tangible "storage" media, terms such as computer or machine "readable medium", refer to any medium that participates in providing instructions to a processor for execution. Further, the term "non-transitory" computer readable media includes both volatile and non-volatile media, including RAM. In other words, non-transitory computer media excludes only transitory propagating signals per se, but includes at least register memory, processor cache, RAM, and equivalents thereof.

Therefore, a machine-readable medium, such as computer-executable code and/or related data structures, may take many forms, including but not limited to, a tangible storage medium, a carrier wave medium or physical transmission medium. Non-volatile storage media include, for example, optical, magnetic, or solid state disks, such as any of the storage devices in any computer(s) or the like, such as may be used to house the databases. Volatile storage media include dynamic memory, such as main memory of such a computer platform. Tangible transmission media may include coaxial cables, copper wire and fiber optics, communication buses. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

A web browser or mobile application may embed and/or access a browser plug-in or extension 103. As known in the art, an extension may be implemented in different forms, including a callable script implemented using a scripting language, such as JavaScript. A web browser 102 may call or invoke a script built and injected into a webpage and loaded by a browser type application. As discussed hereinafter, a browser extension 103 may communicate with the application server 110 so as to retrieve stored e-commerce information, such as but not limited to, electronic coupon codes of a merchant website.

A client device 101 may include device specific storage functionality such as browser extension local storage or mobile application local storage capable of storing certain e-commerce information. For example, device local storage may be configured to store a plurality of electronic coupon codes or response data to codes checked against a website's "checkout page".

In one embodiment, device local storage may submit response data to the application server 110, so as to store and maintain successful electronic coupon codes. Response submission may be initiated by the browser extension 103 and may be carried out as a background process. Unsuccessful electronic coupon code responses may flag an electronic coupon code to be deleted or human reviewed.

For the ease of illustration, the present disclosure primarily features a web browser application of a client device 101 used to conduct e-commerce website transactions, and a browser extension 103 used by the client device 101 to render client side functionalities of the disclosed method. However, additional embodiments and implementations are envisioned by the present invention.

The present invention provides for a system, method, and computer program for providing, automatically trying, and applying electronic coupon codes and cash back in electronic commerce. Drawing attention to FIGS. 2-6, embodiments of the present invention are illustrated from an end user's perspective.

Figure 2:
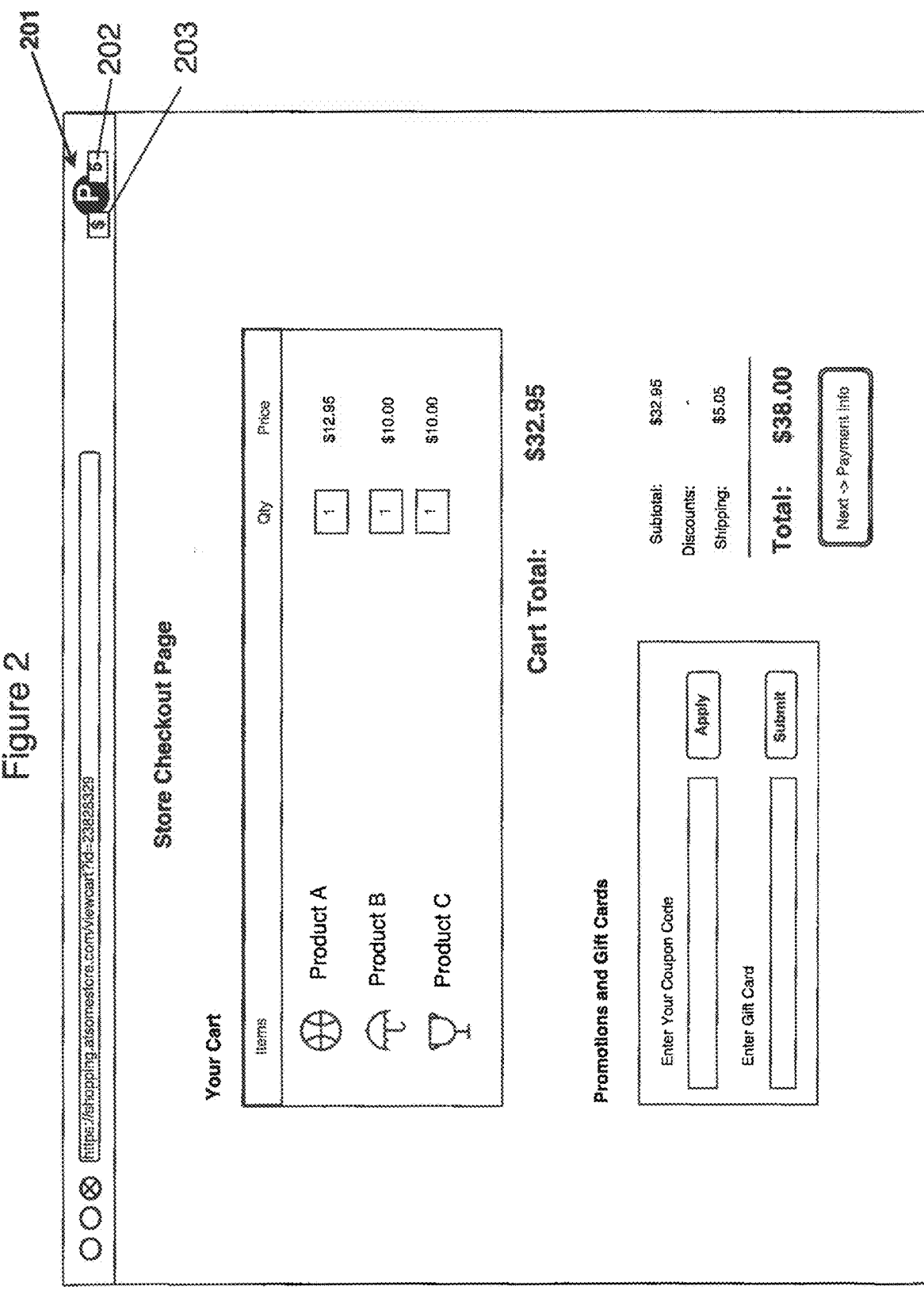
FIG. 2 is an exemplary user interface of a browser application for providing electronic coupon codes and cash back in electronic commerce of the present invention, illustrating end user functionality.

Drawing attention to FIG. 2, the present invention may comprise a browser plug-in or extension that may appear dormant until being 'activated' and injected into the user interface upon navigation to a "checkout page" of a supported e-commerce website, as discussed in detail hereinafter. In at least one embodiment, the user may be provided with an icon plug-in 201, for example, displayed on the browser's toolbar. The icon plug-in 201, may comprise specific e-commerce information regarding the currently navigated website via back-end communications with the application server 110, as discussed in greater detail hereinafter. The icon plug-in 201 may comprise a coupon code icon 202, representing a total amount of electronic coupon codes from the application server 110 for the current website. In another embodiment, the icon plug-in 201 may comprise a cash back icon 203, for example, indicated by dollar signs. The cash back icon 203, may indicate to the user that the current website offers some form of 'cash back' on purchases made via the current e-commerce website.

Upon initially navigating to a website, the application 100 may detect and capture URL information, such as the domain name, to send as a parameter to the application server 110 in order to validate that the website is supported, as known to those skilled in the art. If supported, the application 100 may retrieve specific e-commerce information and store it locally, such as, to the device's temporary local storage until the user navigates to the current website's "checkout page". Upon navigation to a different website, the application 100 will repeat the above process.

For example, the coupon code icon 202, may display the number '5' indicating that there are five merchant electronic coupon codes provided for the user by the application server 110. In one embodiment, the icon plug-in 201 may appear colorless and without the coupon code or cash back icons 202, 203. This may happen for example, upon navigation to an unsupported website or if the application 100 cannot communicate with the website due to operating system limitations. In at least one embodiment, the icons 201, 202, 203 may appear with color upon navigation to a supported website, in order to alert the user to possible savings. In some embodiments, the icon plug-in 201 may be an interactive user interface element, such as a button. Upon click through of this button 201, the user may be provided with e-commerce information, such as individual electronic coupon codes, which may be viewable and/or selectable. In one embodiment, the user may cut and paste coupon code(s) into a "Coupon Code" type input field of the website's checkout page.

Figure 3:
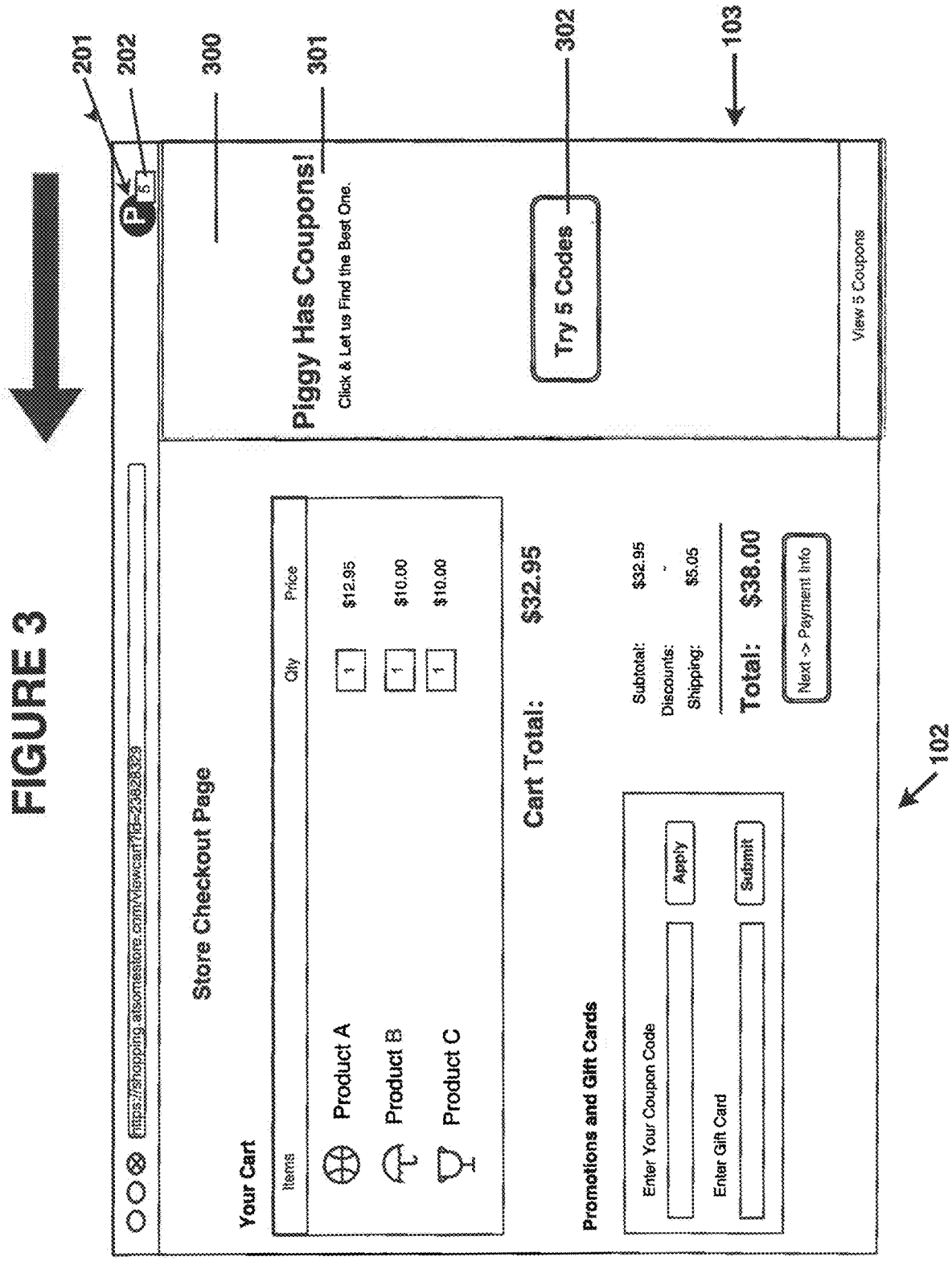
FIG. 3 is an exemplary user interface of a browser application for providing electronic coupon codes and cash back in electronic commerce of the present invention, illustrating end user functionality with a browser extension.

Drawing attention to FIG. 3, when a "checkout page" of an e-commerce website is detected by the application 100, the dormant or embedded browser extension 103 may be activated or invoked into an already loaded webpage 102. As illustrated, the browser extension 103, here in the form of a user interface 'panel' 300, may be slid or injected into the current website's "checkout page" in order to alert the user to possible savings. The browser extension 103, may take various shapes or colors and be injected into different areas of the current website 102 in order to best alert the user. The browser extension 103 may include a coupon code message 301 indicating to the user that the application 100 has provided the user with at least one electronic coupon code and an interactive button, such as a "Try Codes" button 302, prompting the user to try the codes against the items currently in the user's shopping cart. In one embodiment, the browser extension 103 may automatically begin checking and applying electronic coupon codes against cart items upon activation.

In one embodiment, upon detecting a "checkout page" the application 100 may parse the user's shopping cart and capture item specific information, such as description(s) or product identifier(s), send as parameters to the application server, and retrieve only product specific electronic coupon codes, as known to those skilled in the art.

Figure 4:
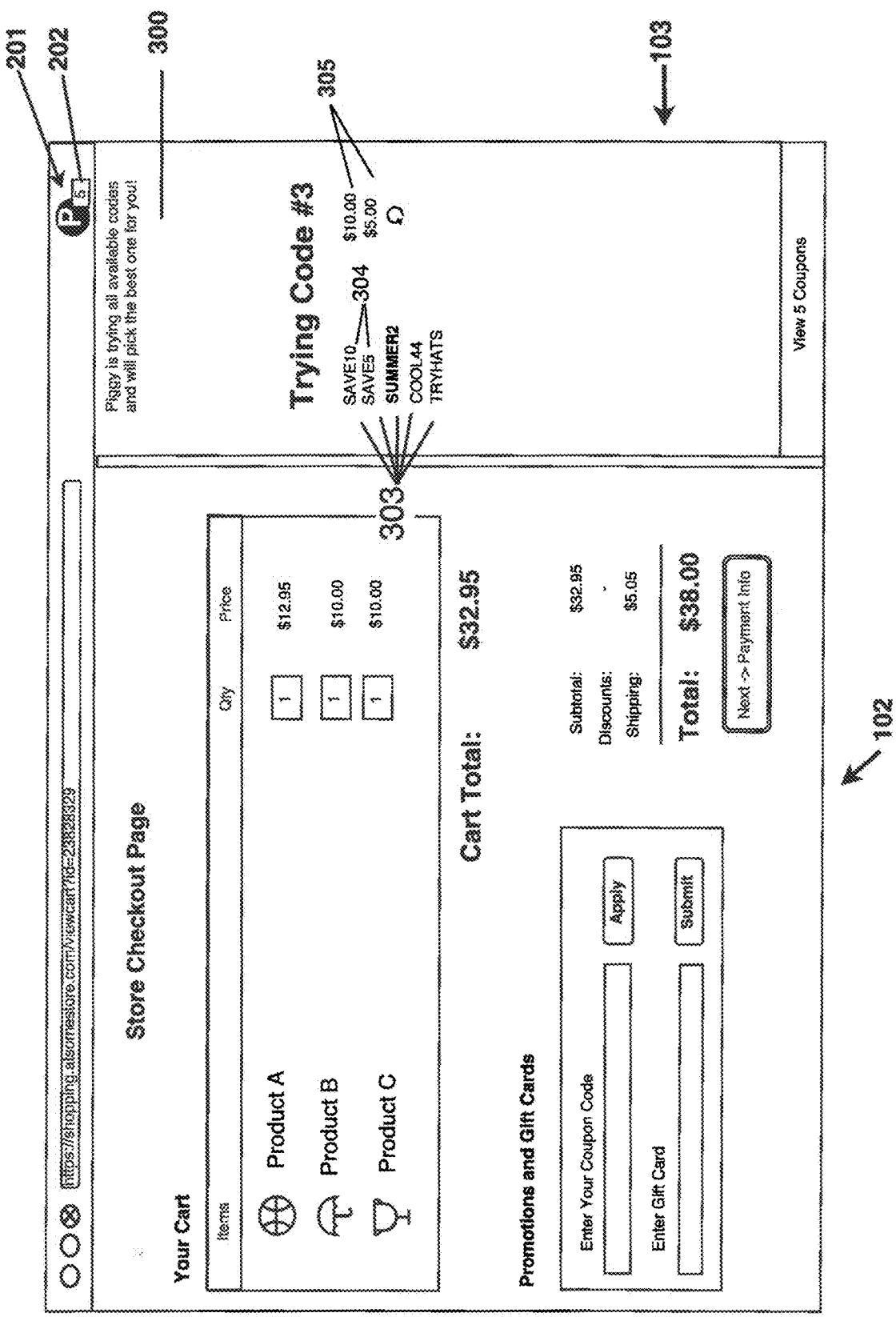
FIG. 4 is an exemplary user interface of a browser application for providing electronic coupon codes and cash back in electronic commerce of the present invention, illustrating end user functionality with a browser extension.

Upon selecting the "Try Codes" button 302, the application 100 will check or test each electronic coupon code saved locally against the items within the user's shopping cart. In one embodiment, the application 100 may check all the electronic coupon codes within a background process, hidden to the user. In other embodiments, the browser extension 103 may provide the user with the results on the UI panel 300 as each electronic coupon code is checked in sequence. As illustrated in FIG. 4, the browser extension 103 may initially display a sequential list 303 of all electronic coupon codes to be tested, each code including a coupon code description 304. As each electronic coupon code is checked against the website, the application 100 may update the UI panel 300 with "live" results to allow the users to have updated feedback for each code tested in the process. For example, if a electronic coupon code is checked and found to be successful in saving the user money, the application 100 will calculate a coupon code savings 305, representing how much money the electronic coupon code will save the user. In one embodiment, the application will display the coupon code savings 305 next to the coupon code description 304 of the UI panel 300. In at least one embodiment, if a electronic coupon code has a negative or failure result, the application 100 may draw a line through the coupon code description 304 indicating to the user that the electronic coupon code does not save the user money on any items within the current shopping cart. In another embodiment, the application 100 may put an 'X' in the coupon code savings 305, indicating the failure of the electronic coupon code.

Figure 5:
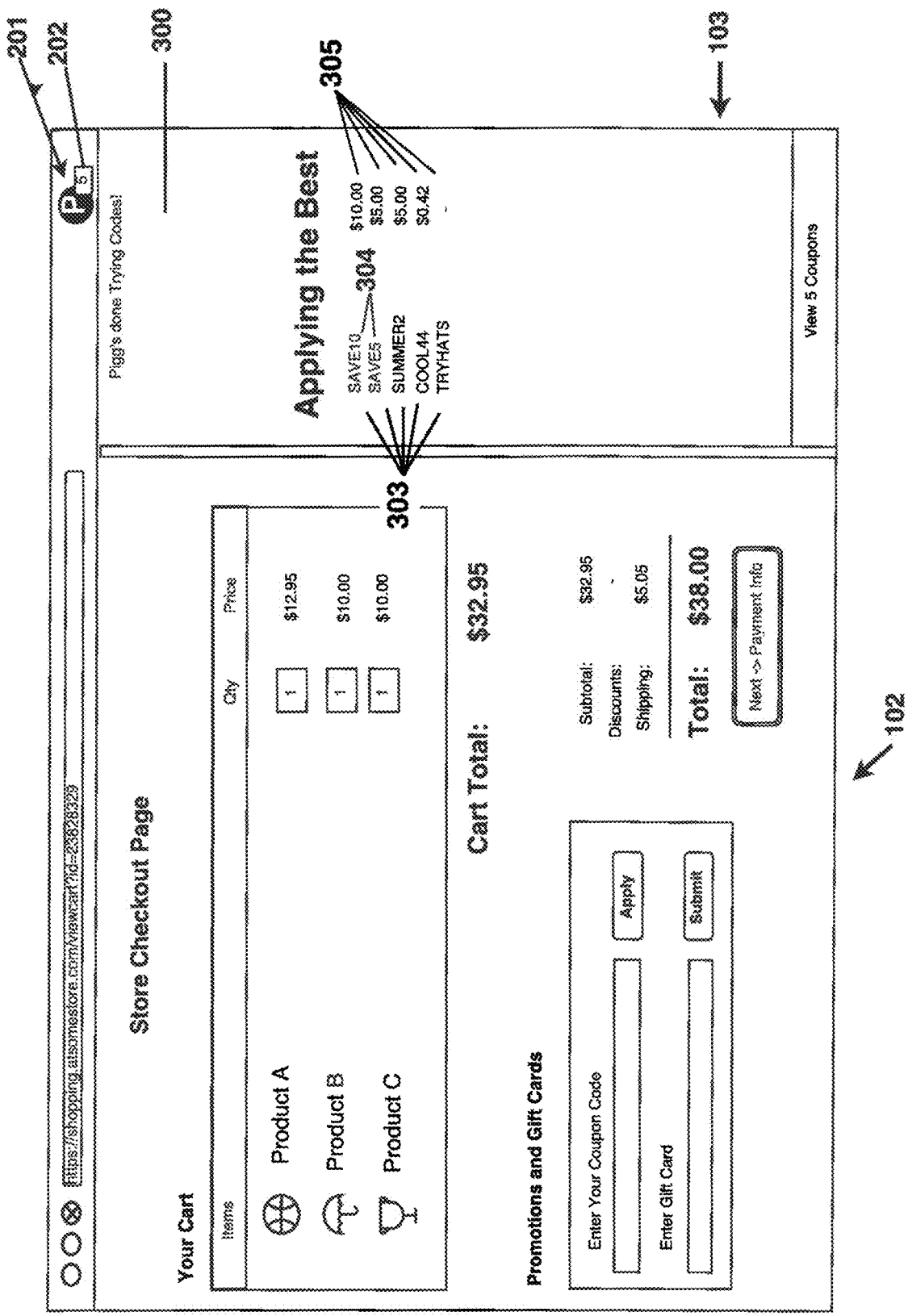
FIG. 5 is an exemplary user interface of a browser application for providing a providing electronic coupon codes and cash back in electronic commerce of the present invention, illustrating end user functionality with a browser extension.

As illustrated in FIG. 5, the application may rank the coupon code descriptions 304 by coupon code savings 305 in order of money that may be saved from highest to lowest. If the website's checkout page only allows one coupon code description 304 per transaction, the application 100 will apply the highest or best ranked coupon code savings 305 into the 'Coupon Code' input field of the website's checkout page. In one embodiment, where the website's checkout page allows more than one coupon code description 304 to be applied, but has a 'maximum' electronic coupon code rule, the application 100 may check all electronic coupon code combinations from the prior 'pool' of the successful electronic coupon codes per the saved results, and apply the best code combination (that saves the user the most money). In another embodiment, where the website's checkout page allows more than one coupon code description 304 to be applied and does not have a 'maximum' electronic coupon code rule, the application 100 may apply all successful electronic coupon codes in order from the best or highest coupon code savings 305 to the lowest.

Figure 6:
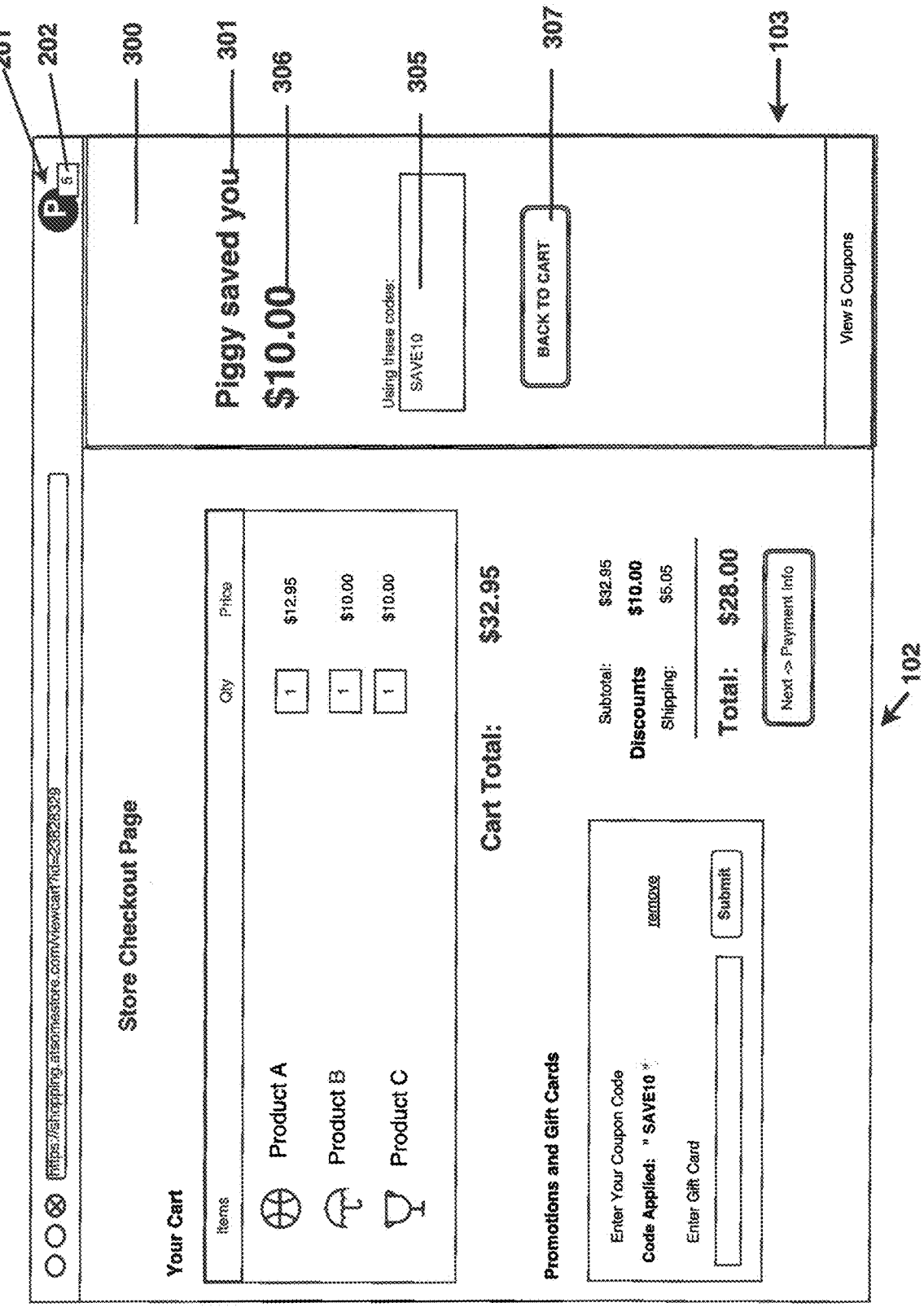
FIG. 6 is an exemplary user interface of a browser application for providing a providing electronic coupon codes and cash back in electronic commerce of the present invention, illustrating end user functionality with a browser extension.

FIG. 6 illustrates the browser 102 and browser extension 103 after the application 100 has applied the best code(s) to the website. The UI panel 300 of the browser extension 103 may include the coupon code description(s) 305 of applied electronic coupon code(s) and the total coupon code savings 306 indicating how much money the user saved per applied electronic coupon code(s). The UI panel 300 may also include a button, such as 'BACK TO CART' button 307, which may put the UI panel back to a dormant state upon click through. In one embodiment, the application 100 may automatically enter the applied code(s) into the user's shopping cart 'Coupon Code' input field of the website's checkout page. In another embodiment, the application 100 may automatically update or reload the user's view to properly reflect the results of applying electronic coupon code(s) and its changes on the 'Discount' and/or 'Total' fields, or equivalents, of the website's checkout page.

In another embodiment, the present invention may be implementable on the application server 110 in a mobile environment in accordance with implementation on an application 100 as represented in FIG. 1. This embodiment of the present invention may provide a method for automatically providing and applying e-commerce savings, such as electronic coupon codes and/or "cash back" in electronic commerce transactions, as described in greater detail hereinafter. Drawing attention to FIGS. 7-11, embodiments of the present invention are illustrated from an end user's perspective.

Upon initially navigating to a website 1102, the application 100 may automatically detect and capture certain website URL information, such as the domain name, to send as a parameter to the application server 110 in order to validate that the website 1102 is supported by the application 100. If supported, the application 100 may automatically retrieve the electronic coupon codes and/or "cash back" associated with the website 1102. The application 100 may detect, capture, and/or retrieve within a background process, hidden to the user. In one embodiment, the application 100 may prompt the user to 'manually' detect the website URL information, via an interactive user interface element, such as a button, in order to retrieve the website e-commerce savings.

The application 100 may store the e-commerce savings information locally, such as, to the client device's 101 temporary local storage until the user navigates to the current website's "checkout page" which may alert the user to possible savings. Upon navigation to a different website, the application 100 will repeat the above process. A website's "checkout page" may at least partially comprise a webpage of the website wherein the user is able to initiate an e-commerce transaction. In one embodiment, the "checkout page" may comprise one webpage. In other embodiments, the "checkout page" may comprise more than one webpage with differing names, for example, a "shopping cart page" and a "checkout page".

In one embodiment, the application 100 may retrieve the website's 'ruleset' from the application server 110. A ruleset may comprise certain website information, such as a webpage element. For example, the ruleset may comprise the location of a webpage field within a webpage(s), such as a coupon code input field, in order to determine if the user has navigated to the website's "checkout page". The application 100 may monitor the current website 1102 to determine if the user has navigated to the "checkout page" of the website, for example, via the coupon code input field. In another embodiment, the application 100 may retrieve an external provider ruleset from the application server 100 that is at least partially associated with the website's 'ruleset'.

Figure 7:
FIG. 7 is another exemplary user interface of a browser application for providing electronic coupon codes and cash back in electronic commerce of the present invention, illustrating end user functionality.

Drawing attention to FIG. 7, when the application 100 determines that the user has navigated to the supported website's "checkout page", the application 100 may 'activate' and inject an icon plug-in 1201 into the into an already loaded web browser in order to alert the user that electronic coupon codes and/or "cash back" are available. In one embodiment, the icon plug-in 1201 may automatically be injected on the user's web browser, as is represented in FIG. 7. In another embodiment, the icon plug-in 1201 may be injected within the browser and accessible to the user after selecting a web browser button, such as the "share" button.

The icon plug-in 1201 may comprise a coupon code icon 1202, representing a total amount of electronic coupon codes from the application server 110 for the current website. In one embodiment, the icon plug-in 1201 may also comprise a cash back icon, for example, indicated by dollar signs. The cash back icon 1203, may indicate to the user that the current website offers some form of 'cash back' on purchases made via the current e-commerce website. The icon plug-in 1201 may be an interactive user interface element, such as a 'clickable' or selectable button.

More specifically, for example, the coupon code icon 1202 may display the number '2' indicating that there are two merchant electronic coupon codes provided for the user by the application server 110. Upon selection of the icon plug-in 1201, the user may be provided with specific e-commerce information, such as individual electronic coupon codes, which may be viewable and/or selectable. In one embodiment, the user may 'cut and paste' coupon code(s) directly into an input field of the website's checkout page.

Figure 8:
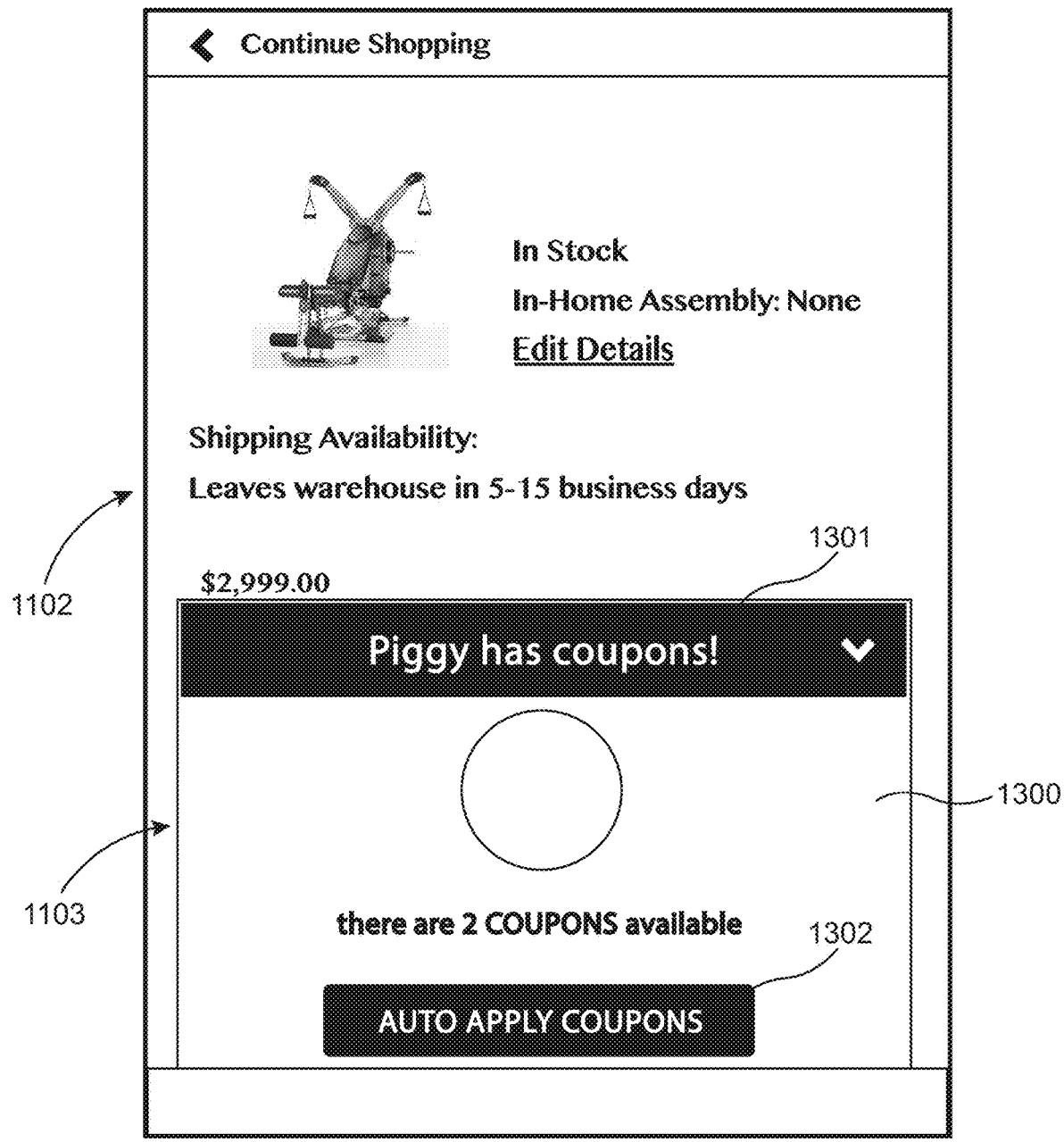
FIG. 8 is another exemplary user interface of a browser application for providing electronic coupon codes and cash back in electronic commerce of the present invention, illustrating end user functionality with a browser extension.

Drawing attention to FIG. 8, the present invention may comprise a browser plug-in or extension 1103 that may appear dormant until being 'activated' and injected into the web browser. More specifically, upon selection of the icon plug-in 1201, the dormant or embedded browser extension 1103 may be activated or injected into the already loaded "checkout page" 1102. As illustrated, the browser extension 1103, here in the form of a web browser 'panel' 1300, may be slid or injected into the current website's "checkout page" in order to alert the user to specific possible savings.

The browser extension 1103, may take various shapes or colors and be injected into different areas of the current website 1102 in order to best alert the user. The browser extension 1103 may include a coupon code message 1301 indicating to the user that the application 100 has provided the user with at least one electronic coupon code and an interactive button, such as an "AUTO APPLY COUPONS" button 1302, prompting the user to check the coupon code(s) against the items currently in the user's 'shopping cart' of the website's "checkout page". In one embodiment, the browser extension 1103 may automatically begin checking electronic coupon codes against cart items upon activation or injection. In another embodiment, upon detecting a "checkout page" the application 100 may parse the user's shopping cart and capture item specific information, such as description(s) or product identifier(s), to send as parameters to the application server 110 and retrieve only product specific electronic coupon codes.

Figure 9:
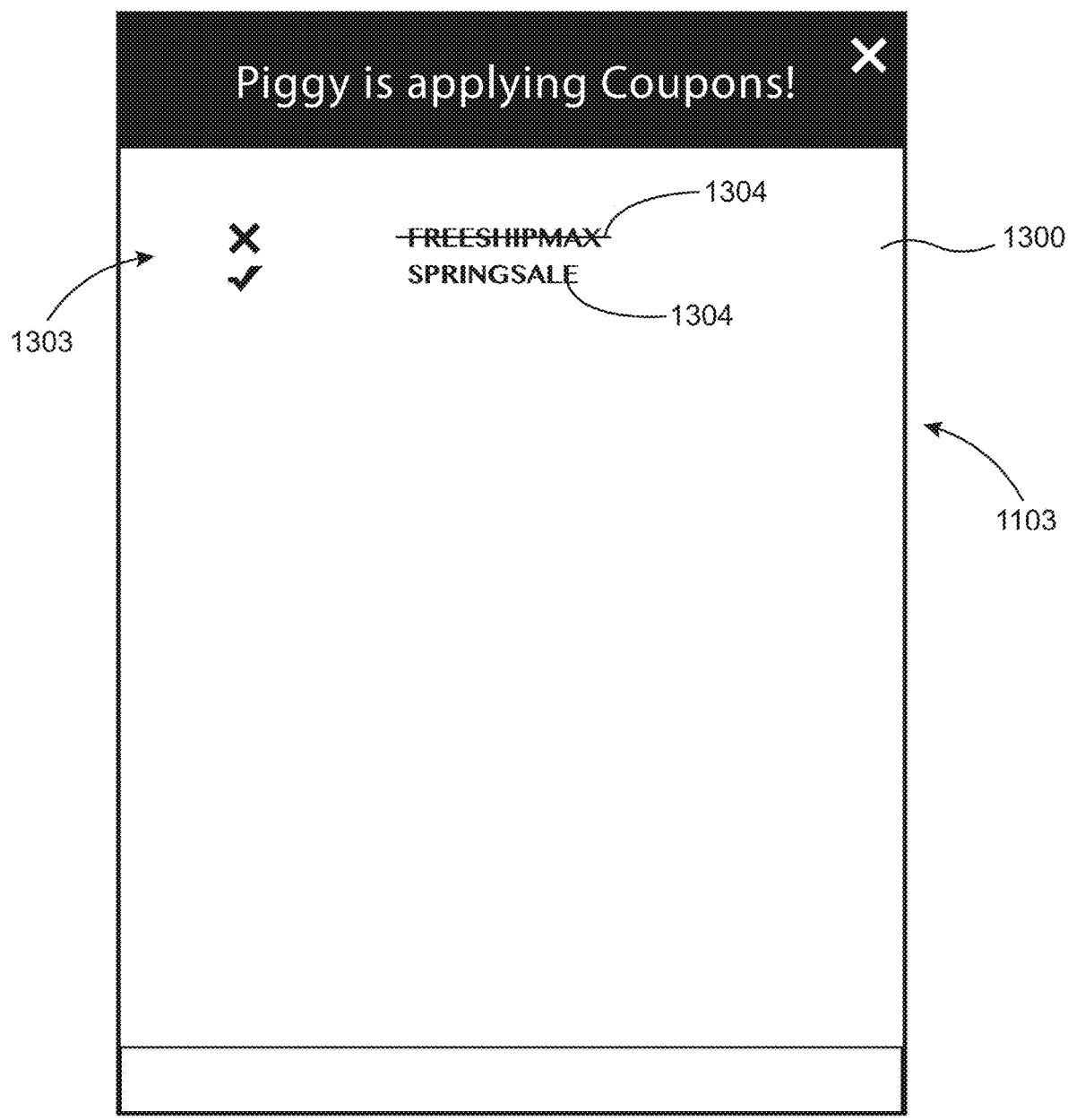
FIG. 9 is another exemplary user interface of a browser application for providing electronic coupon codes and cash back in electronic commerce of the present invention, illustrating end user functionality with a browser extension.

As illustrated in FIG. 9, upon selecting the "AUTO APPLY COUPONS" button 1302, the application 100 will check or test each electronic coupon code against the items within the user's shopping cart. The browser extension 1103 may provide the user with the results on the 'panel' 1300 as each electronic coupon code is checked in sequence. If there is more than one coupon code, the browser extension 1103 may initially display a sequential list 1303 of all electronic coupon codes to be tested. Each coupon code may include a coupon code description 1304. In one embodiment, the application 100 may check all the electronic coupon codes within a background process, hidden to the user.

As each electronic coupon code is checked against the website 1102, the application 100 may update the 'panel' 1300 with "live" results to allow the user to have updated feedback for each code tested in the process. For example, if an electronic coupon code is checked and found to be successful in saving the user money, the application 100 may calculate a coupon code savings, representing how much money the electronic coupon code will save the user. In one embodiment, the application will display the coupon code savings next to the coupon code description 1304 of the panel 1300.

In at least one embodiment, if an electronic coupon code has a negative or failure result, the application 100 may draw a line through the coupon code description 1304 indicating to the user that the electronic coupon code does not save the user money on any items within the current 'shopping cart'. In another embodiment, the application 100 may put an 'X' near the coupon code description 1304, indicating the failure of the electronic coupon code.

The application 100 may check the coupon codes against the website by executing a background process to determine whether the electronic coupon code(s) is successful or fails to achieve a reduction of the user's e-commerce transaction amount. The result of determining whether the electronic coupon code(s) is successful or fails to achieve a reduction in the user's e-commerce transaction amount may comprise "response" information from the website, which may be stored locally on the user's device.

Figure 10:
FIG. 10 is another exemplary user interface of a browser application for providing a providing electronic coupon codes and cash back in electronic commerce of the present invention, illustrating end user functionality with a browser extension.

As illustrated in FIG. 10, the application 100 may display the total amount the user may save from the coupon code(s) that were checked against the website's checkout page. An interactive button, such as an "UPDATE CART" button 1305, may prompt the user to apply the coupon code(s) against the user's 'shopping cart' of the website's "checkout page". In one embodiment, the application 100 may apply the checked coupon code(s) automatically. Upon selection, the user's shopping cart will be updated to reflect the savings provided by the applied coupon code(s).

In one embodiment, the application 100 may rank the coupon codes in order of money that may be saved, such as from highest to lowest. If the website's checkout page only allows one coupon code per transaction, the application 100 will apply the highest or best ranked coupon code input field of the website's checkout page. In another embodiment, where the website's checkout page allows more than one coupon code to be applied, but has a 'maximum' electronic coupon code rule, the application 100 may check all electronic coupon code combinations from the prior 'pool' of the successful electronic coupon codes per the saved results, and apply the best code combination (that saves the user the most money).

In another embodiment, where the website's checkout page allows more than one coupon code to be applied and does not have a 'maximum' electronic coupon code rule, the application 100 may apply all successful electronic coupon codes in order from the best or highest coupon code savings to the lowest. In one embodiment, the application 100 may prompt the user to apply at least one coupon code against the website's checkout webpage. In another embodiment, the application 100 may automatically apply at least one coupon code against the website's checkout webpage.

Figure 11:
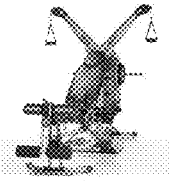
FIG. 11 is another exemplary user interface of a browser application for providing a providing electronic coupon codes and cash back in electronic commerce of the present invention, illustrating end user functionality with a browser extension.

FIG. 11 illustrates the e-commerce website 1102 after the application 100 has applied the best coupon code(s) to the shopping cart items of the website. As illustrated, the website 1102 may display a "new" total amount after applying the coupon code(s) and other discounts. In one embodiment, the application 100 may automatically enter the applied code(s) into the user's 'shopping cart' coupon code input field of the website's checkout page. In another embodiment, the application 100 may automatically update or reload the user's view to properly reflect the results of applying electronic coupon code(s) and its changes, for example on a 'Discount' and/or 'Total' fields, of the website's "checkout page", as illustrated in FIG. 11.

Additionally, when the user navigates to the checkout page, the application 100 may 'activate' the cash back functionality associated with the e-commerce transaction within a background process, hidden to the user. In one embodiment, while the application 100 'activates' the cash back functionality, the application 100 may concurrently inject a browser plug-in into the checkout page of the web browser. The application 100 may automatically activate the cash back functionality. More specifically, when the user has navigated to the checkout page, as illustrated in FIG. 11, the application 100 may capture certain information, such as the website domain name, the total amount of the purchase, user information (for example, user number, user name, user address, etc.) to send as a parameter(s) to the application server 110 in order to validate that the website 1102 is supported or affiliated by the application 100.

If supported, the cash back functionality may be 'activated' or saved to the application server 100 in order to provide the user with his or her cash back savings. If activated, e-commerce transaction information, such as the total amount of the purchase, user information, etc., may be saved to the application server 110. The application 100 may calculate and provide the user with the cash back savings, for example, in the form of a rebate check. In another embodiment, the application 100 may prompt the user to 'manually' activate the cash back functionality, via an interactive user interface element, such as a button. Upon activation, the application 100 may display the cash back savings in the web browser, for example, via a browser plug-in.

As mentioned above, the application server 110 may save or track the user's e-commerce transaction, via user information, such as the user number, user name, etc. In one embodiment, the application 100 may track an 'unknown' user's e-commerce transactions anonymously, in order to offer the user cash back on purchases. Tracking the e-commerce transaction anonymously may comprise calculating a 'cash back' amount earned associated with the e-commerce transaction. The application 100 may track the e-commerce transaction across a plurality of separate e-commerce transactions, calculating the cash back amount earned associated with each of the plurality of separate e-commerce transactions, and associating each of the cash back amounts with the user via an anonymous client device identifier, as known to those in the art.

Figure 12:
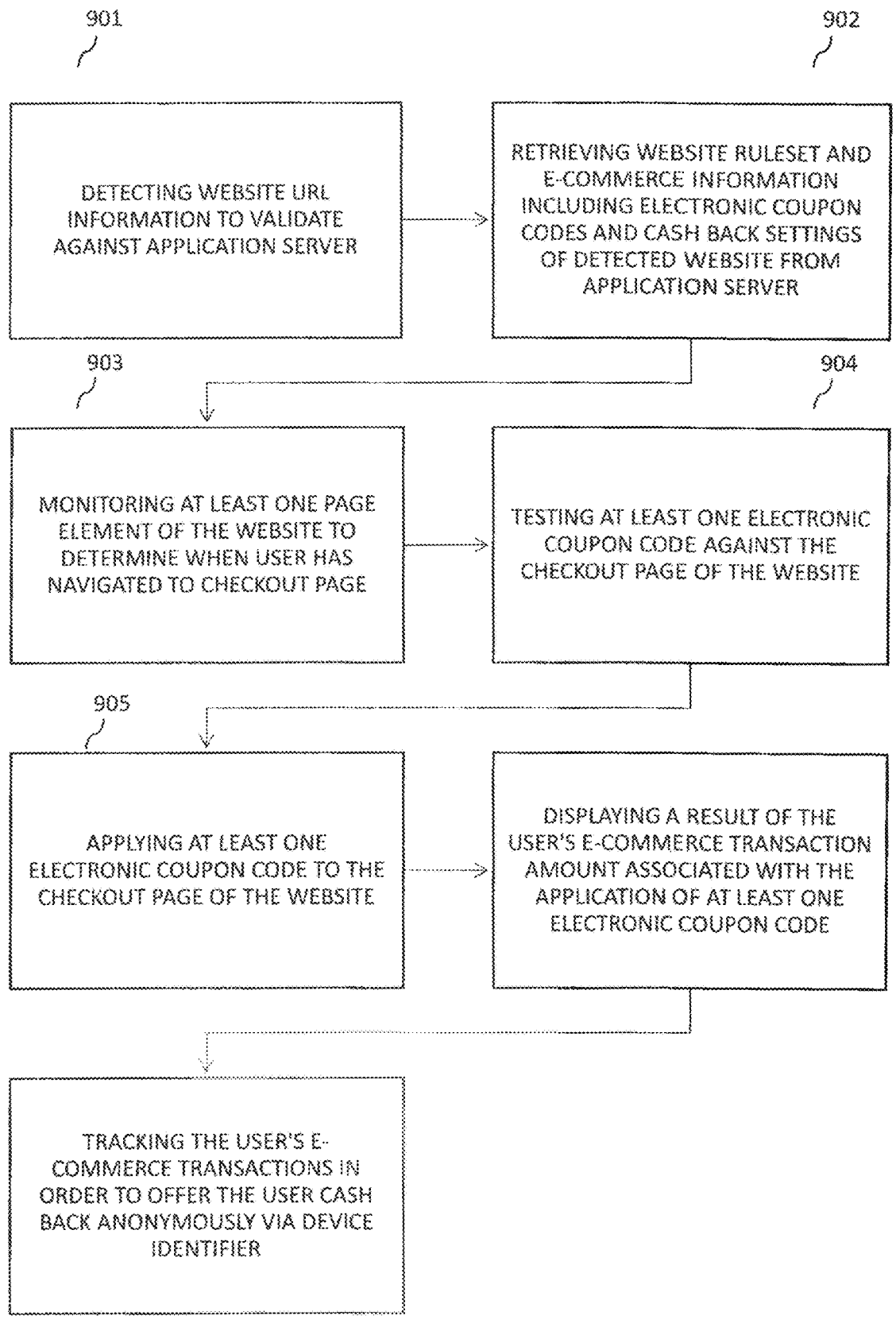
FIG. 12 is a flow chart depicting steps of a method according to one embodiment of present invention.

Drawing attention to FIG. 12, a method of the present invention may initially comprise detecting a URL or domain name of a website to determine if the webpage is supported by an application server by submitting parameters, such as a URL address or domain name, to the application server, as in 901. The application may continuously monitor for URI/URL changes and automatically access the application server to determine if the webpage is supported. The application may access the application server via a mobile application interface installed on the client device, or via a browser accessing the application server as described above. In some embodiments, websites may not be in 'communication' with the application due to operating system limitations and may require a manual detection to determine if the current website is supported by the application server. This manual detection may include another browser extension, designed to capture URL or domain name information, such as by DOM parsing of the website. This information may then be submitted to the application server.

Next, in 902, if the website is supported by the application server, specific stored merchant information, such as but not limited to, a website ruleset, electronic coupon codes, and cash back settings, is retrieved from the application server and saved locally on the user's device. In one embodiment, all electronic coupon codes of the supported website may be retrieved from the application server. In another embodiment, all electronic coupon codes may be sorted by the application server based on factors such as past success or user feedback and retrieved. In other embodiments, electronic coupon codes that are more probable for success may be compiled by the application server into a specific list or queue designed to maximize the user's savings, based on several factors of a predefined algorithm or procedure.

For example, some factors may be: success rates reported by users of the application; success of electronic coupon codes applied by the application processes; frequency of appearance of the electronic coupon code(s) on public website(s); or electronic coupon codes containing non-redundant keyword patterns. The electronic coupon codes stored on the application server may be harvested in various ways, such as, programmatically or manually provided by merchant websites via affiliate agreements; collected from general affiliate pools or networks; collected from the internet or other publicly available sources; or submitted by users.

Next, at 903, the application may continuously monitor the URI/URL and webpage elements to detect when a user has navigated to a checkout page or process of the website. If the application detects that the user has navigated to another website, such as by URI/URL changes, the application will repeat step 901. If the application detects certain page elements (based on the website's retrieved ruleset) that indicate the user has navigated to the checkout page, the application may move on to the next step to check electronic coupon codes. In one embodiment, the retrieved ruleset may require item or product specific electronic coupon codes only to test. In such an embodiment, prior to checking the codes, the application may parse the user's shopping cart, capture item information and submit to the application server, retrieve only the item specific electronic coupon codes, and save locally on the user's device.

In some embodiments, websites may not be in 'communication' with the application due to operating system limitations and may require a manual detection as described above. In such embodiments, the application will immediately detect current page elements from the webpage, in which the manual detection was executed from, in order to determine if the user has navigated to the checkout page.

Users next may be prompted to check electronic coupon codes against the item(s) in the user's electronic shopping cart, as in 904. In one embodiment, the application will automatically begin applying electronic coupon codes by executing a background process. In other embodiments, the application may inject a user interface element into the website's checkout page prompting the user to begin checking all or specific electronic coupon codes. The check codes function of the application server may find the user the best possible electronic coupon code(s) with the most possible total savings. The application may save the current subtotal and/or total order amount of the user's cart prior to checking the codes.

In some embodiments, the ruleset may define website provided coupon or promo codes. In such embodiments, where the codes have already been applied to the user's shopping cart, the application may parse and save those applied codes in order to prevent interference with the electronic coupon codes retrieved from the application server.

Electronic coupon codes may be checked against the website's checkout page individually through a defined background process, such as an Ajax request. In one embodiment, some or all electronic coupon codes may be tried all at once by opening and parsing several processes. In another embodiment, some codes may be tried through a "form post" process. In one embodiment, some codes may be tried using device specific functionality, e.g. webview and parsing, such as due to mobile operating system limitations.

In certain embodiments, websites may not be able communicate with the application, or else the application may not be able to detect a URL, due to operating system limitations and may require an alternate way to check electronic coupon codes and determine whether the electronic coupon codes are successful or result in discounts being applied. Accordingly, the application may be configured to build and run a separate script or extension, encapsulating all logic elements and check code functionality as discussed herein, that will pass the electronic coupon codes to the script and check the codes in a submitted backend process, and inject the script into the frontend webpage without requiring the user to reload the webpage.

When a electronic coupon code is checked or validated against the website's checkout page, each response may be saved locally to the user's device and also submitted to the application server for analytic purposes. The application may capture the response, for example, by standard DOM parsing rules or may use site-specific provider rules. In some embodiments, such as websites that require checking electronic coupon codes independently, response information, such as coupon code description and the amount saved, or the rejection reason, may be saved to the local storage of the user's device. In other embodiments, the application may parse the total amount of the user's cart in conjunction with the checked electronic coupon code, and calculate the difference in price, and save this information locally on the user's device. In one embodiment, the application may update the user interface with the results of the check code process in order to allow users to have updated feedback for each code tried in the process(es).

In one embodiment, the ruleset may require the application to copy the user's shopping cart to verify whether the latest electronic coupon code has been applied successfully. In another embodiment, the ruleset may require the application to clear a checked code after the response information has been captured and before checking the next code in the list or queue.

The application may review the local storage on the user's device, determine the best code(s), and apply the code(s) to the user's shopping cart. In one embodiment, the user's cart may only allow one electronic coupon code. If the cart automatically overrides or erases the applied code per the ruleset, the application may re-apply the best code to the user's cart. If the cart requires that the code be cleared per the ruleset, the application may clear the existing code, and re-apply the best code to the user's cart. In another embodiment, the user's cart may allow more than one electronic coupon codes.

If the cart allows more than one code but has a maximum rule per the ruleset, the application may build a new queue of combinations of successful electronic coupon codes that may be applied together. In such an embodiment, the application may apply a plurality of code combinations, capturing the response information of each grouping as discussed above to accurately apply the best code or combination of codes. The best code or combination of codes may be ranked in order from highest to lowest amount saved. If the ruleset defines a limit to the amount saved by codes or total codes that may be applied to a user's cart, the application may apply the best possible combinations to maximize the amount saved.

Next, in 905, the application may display the electronic coupon codes applied to the user's cart and a "Total Amount Saved" message to the user interface. The application may allow the user to "retry" the codes, for example, after altering the cart. In one embodiment, additional savings may be available by manual application of codes to the user's cart. In such embodiments, the application may display a message or highlight the availability to the user. In some embodiments, the user's cart may require a webpage refresh to display the most recent application of electronic coupon codes applied, for example via a background process. The application may record the total amount saved, after the user completes the checkout, for historical purposes.

Next, optionally, in 906 the application may track the user's e-commerce transactions in order to offer the user cash back on purchases anonymously. More specifically, in step 902, cash back settings of an e-commerce website may be retrieved from the application server. For example, an e-commerce website may offer 3% 'cash back' on purchases to the user, as known in the art. In the preferred embodiment, the application may track the user's purchases or transactions anonymously, such that the user may use the cash back functionality after installing the application on his or her device, without divulging personal information to the application. For example, after installing the application, the application may generate a unique device identifier. When the user utilizes the application via the device, such as: purchases, API requests, selecting or clicking "Cash back" button(s), or logging in or creating an account with the application, the application server will detect the unique identifier and save the information. Next, the application will retrieve information, such as cash back earnings, from the application server to update the device's local storage with the cash back earnings.

The application allows the user to later create an account through the application. On occurrence, the application server will compile all transactions assigned to the unique device identifier and re-assign them to the new user account. In one embodiment, if the user creates an account on another device with the application (or via the website), the user may link the account with the identifier via received "signed communications" such as emails or text links. More specifically, a user may receive signed communications on the device that the application is installed. These signed communications may be detected by application listeners on other devices, wherein the application will store the signed communication. Next, the application may send the signature to the application server (which the signature is attributed to the user) and retrieve user data to the application on the new device. The application may then store the user data in permanent storage.

In another embodiment, if the user logs in via the application website, the application may detect the login cookies and session data that is set by the website on the next visit, and logs in the user through the application by storing a permanent device identifier on the device's local storage and on the application server. The user then may log in/out of the website and clear cookies, but the application will remain assigned to the appropriate user id by saving unique application keys in the device's local storage as long as the application remains installed. This is because the user's login status is "cookieless" once assigned to the application and stored permanently in the device's storage.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A method for providing e-commerce information associated with an e-commerce transaction, to users of merchant e-commerce websites comprising:
   detecting a website URL;
   monitoring at least one page element of the website to determine if the user has navigated to a checkout webpage of the website;

upon determining that the user has navigated to the checkout webpage, without user interaction, parsing a shopping cart of the user to determine item specific information pertaining to items in the shopping cart and displaying one or more electronic coupon codes retrieved from an application server, the one or more electronic coupon codes pertaining to the detected website URL as well as the item specific information, and having no prior association with the user;

displaying, based at least in part on a ruleset indicating a number of electronic coupon codes that can be displayed in the checkout webpage, the one or more electronic coupon codes in combination with one or more other electronic coupon codes;

receiving an electronic coupon code selection based on the one or more electronic coupon codes and the one or more other electronic coupon codes displayed in the checkout webpage;

applying the selected electronic coupon code against the checkout webpage; and displaying a result of an e-commerce transaction amount in the checkout webpage associated with the application of the selected electronic coupon code.

2. The method of claim 1 further comprising capturing at least a domain name of the website and transmitting at least the domain name to the application server.

3. The method of claim 2 further comprising prompting the user to manually detect the website URL.

4. The method of claim 1 further comprising retrieving a website ruleset associated with the detected website URL stored on the application server.

5. The method of claim 1 further comprising monitoring at least one webpage element of the website.

6. The method of claim 5 wherein the at least one page element of the website comprises a webpage field.

7. The method of claim 6 wherein the webpage field comprises a coupon code input field.

8. The method of claim 1 further comprising automatically alerting the user to the e-commerce information.

9. The method of claim 4 further comprising retrieving an external provider ruleset from the application server that is at least partially associated with the website ruleset.

10. The method of claim 1 further comprising prompting the user to check the electronic coupon code selection against the checkout webpage.

11. The method of claim 1 further comprising automatically checking the at least one electronic coupon code against the website's checkout webpage.

12. The method of claim 1 further comprising executing a background process to determine whether the at least one electronic coupon code is successful or fails to achieve a reduction of the e-commerce transaction amount.

13. The method of claim 12 wherein the result of determining whether the at least one electronic coupon code is successful or fails to achieve the reduction in the e-commerce transaction amount comprises a response information; and storing the response information locally on a device of the user.

14. The method of claim 12 further comprising ranking the one or more electronic coupon codes according to the amount of the reduction of the e-commerce transaction amount.

15. The method of claim 14 further comprising:
applying, based on at least one of: numerical discount, percentage discount, and combinability of electronic coupon codes, at least the highest ranked electronic coupon code from the one or more electronic coupon codes to a coupon code input field of the checkout webpage;

calculating a coupon code amount saved associated with applying the highest ranked electronic coupon code;

calculating and updating a subtotal field of the checkout webpage, based on applying the highest ranked electronic coupon code; and displaying the applied highest ranked electronic coupon code.

16. The method of claim 1 further comprising prompting the user to apply the electronic coupon code against the website's checkout webpage.

17. The method of claim 1 further comprising automatically applying the electronic coupon code against the website's checkout webpage.

18. The method of claim 1 further comprising tracking the e-commerce transaction.

19. The method of claim 18 wherein the tracking the e-commerce transaction comprises tracking the e-commerce transaction anonymously.

20. A method for providing e-commerce information associated with an e-commerce transaction, to users of merchant e-commerce websites comprising:

detecting a website URL;

monitoring at least one page element of the website to determine if the user has navigated to a checkout webpage of the website;

upon determining that the user has navigated to the checkout webpage, without user interaction, parsing the shopping cart of the user to determine item specific information pertaining to items in the shopping cart and retrieving cash back information from an application server to be displayed, the cash back information pertaining to the item specific information and having no prior association with the user;

displaying, based at least in part on a ruleset indicating a number of cash back information that can be displayed in the checkout webpage, the cash back information in combination with one or more other cash back information;

activating cash back functionality corresponding to the e-commerce transaction based on the cash back information and the one or more other cash back information; and displaying a result of the e-commence transaction in the checkout webpage associated with the activation of the cash back functionality.

21. The method of claim 20 further comprising tracking the e-commerce transaction anonymously.

22. The method of claim 21 further comprising calculating a cash back amount earned associated with the e-commerce transaction.

23. The method of claim 22 further comprising tracking the e-commerce transaction across a plurality of separate e-commerce transactions; calculating the cash back amount earned associated with each of the plurality of separate e-commerce transactions; and associating each of the cash back amounts with the user via an anonymous client device identifier.

24. The method of claim 20 further comprising activating cash back functionality corresponding to an e-commerce transaction automatically.

* * * * *